United States Patent [19]
Petrosky et al.

[11] Patent Number: 5,317,611
[45] Date of Patent: May 31, 1994

[54] STACKABLE TRUNCATED CONICAL SHELL FUEL ELEMENT AND AN ASSEMBLY THEREOF FOR A NUCLEAR THERMAL ENGINE

[75] Inventors: Lyman J. Petrosky, Unity Township, Westmoreland County; Joseph F. Ivanenok, III, North Huntingdon; Mario D. Carelli, Greensburg, all of Pa.

[73] Assignee: Westinghouse Electric Corp., Pittsburgh, Pa.

[21] Appl. No.: 878,934

[22] Filed: May 5, 1992

[51] Int. Cl.⁵ ................................. G21C 3/02
[52] U.S. Cl. .................... 376/433; 376/318; 376/455; 376/903
[58] Field of Search ............... 376/433, 455, 454, 453, 376/903, 429, 428, 318, 317

[56] References Cited
U.S. PATENT DOCUMENTS

| | | | |
|---|---|---|---|
| 2,799,642 | 7/1957 | Hurwitz, Jr. et al. | 376/455 |
| 3,150,054 | 9/1964 | Fox | 376/318 |
| 3,311,541 | 3/1967 | Eyre | 376/432 |
| 3,374,148 | 3/1968 | Rom et al. | 376/318 |
| 3,801,450 | 4/1974 | Barthels et al. | 376/429 |

Primary Examiner—Daniel D. Wasil
Attorney, Agent, or Firm—J. C. Valentine

[57] ABSTRACT

A modular fuel assembly for a nuclear thermal engine includes a plurality of fuel elements each having a fueled, truncated conical shell and an unfueled peripheral lip at the base of the shell with radial passages therethrough. The fuel elements are nested with the lips seating one on top of another to form a stack of fuel elements with frusto-conical flow passages between the shells of adjacent fuel elements which are divided into channels by ribs on the conical shells. The stack of fuel elements is mounted in a cylindrical housing with the bases of the shells facing a central inlet opening at one end of the housing. Propellant enters the central inlet opening, is deflected radially outward by a deflector into an annular flow distribution channel from which it flows radially inward through the passages in the fuel element lips, through the flow channels of frusto-conical passages between the fueled shells where it is heated, and out through a central exhaust passage.

18 Claims, 4 Drawing Sheets

STACKABLE TRUNCATED CONICAL SHELL FUEL ELEMENT AND AN ASSEMBLY THEREOF FOR A NUCLEAR THERMAL ENGINE

BACKGROUND

1. Field of the Invention

This invention relates to fuel elements and assemblies thereof for nuclear thermal engines.

2. Background of the Invention

Nuclear thermal engines utilize fissionable material to heat a propellant, typically hydrogen, which is discharged through a nozzle to generate thrust. A design objective in such engines is to achieve a high thrust-to-weight and specific impulse. This requires a core design featuring a compact configuration with high heat transfer area, a high coefficient of heat transfer and optimum flow rate and flow velocity.

An early design for nuclear thermal engines used prismatic fuel elements in the form of hexagonal rods stacked side by side with a pattern of longitudinal bores in each rod through which propellant flowed axially. Such fuel elements were subject to stress induced cracking between the bores as a result of the very high thermal stresses occurring during operation.

An experimental particle bed fuel element utilizes small fuel beads packed in an annular support. Propellant flows radially inward through a porous peripheral wall, the particle bed and a porous annular inner wall, and then flows axially out through a central passage. These particle bed fuel elements can develop hot spots causing melting of the fuel beads. Thus, while the particle bed fuel elements have a high heat transfer capability, it is difficult to control propellant flow through them and they have poor mechanical stability.

Another proposed design utilizes flat annular plates with radial grooves or holes for propellant flow radially inward to a central discharge passage. However, the very high temperature gradient, for example 100° K at the periphery and 3000° K at the central discharge passage, produces severe stress cracking in the flat, annular plates.

A suggestion has been made to utilize fueled truncated conical shells seated on one another with grooves in the contacting confronting shell surfaces for coolant flow. See, also, U.S. Pat. No. 3,150,054 to Fox, which shows a truncated conical reactor design.

There is a need therefore for improved fuel elements and assemblies for nuclear thermal engines.

SUMMARY OF THE INVENTION

It is the primary object of the invention to provide an improved fuel element and assembly for nuclear thermal engines, and in particular for nuclear thermal rocket propulsion engines.

It is a more particular object of the invention to provide such improved fuel elements and assemblies having high heat transfer area, high power density without hot spots, and in which the flow is readily controllable.

It is also an object of the invention to provide such improved fuel elements and assemblies which are modular so that different engines with different thrust ratings can be easily fabricated.

It is another object of the invention to provide such improved fuel elements and assemblies which can be constructed with existing technology.

These and other objects are realized in fuel elements of the type having a truncated conical shell tapering inward from a base, typically at an angle of between about 30° to 60° and preferably about 45° to 60°. Conical shell fuel elements embodying the present invention have an unfueled annular lip extends radially outward at the base of the truncated conical shell, and has radial passages through which propellant flows inwardly. The annular lips of multiple fuel elements stack one on top of another to form a stack of fuel elements with frusto-conical flow passages between adjacent elements Angularly spaced, radially extending ribs on one surface, preferably the outer surface, of the truncated conical shells of the fuel elements form propellant flow channels in the frusto-conical flow passages between elements While not sized to contact the adjacent fuel element in the stack, the ribs maintain the spacing between elements distorted by the heat. The truncated open ends of the shells are free to expand and contract independently without creating significant stresses.

The stack of truncated conical shell fuel elements is supported in a fuel assembly which comprises a cylindrical housing with a central inlet opening at one end and a central outlet at the opposite end. The stack of fuel elements is mounted in the housing with an annular flow distribution channel between the periphery of the stack and the housing. A central baffle spaced from the inlet opening deflects propellant entering through the inlet opening to the annular flow distribution channel through which it flows axially and then radially inward through the passages in the lips, over the truncated conical shells through the channels formed by the ribs, and then axially out through the centers of the truncated conical shells and the outlet opening. An annular spring maintains alignment of the stack of fuel elements and takes up all axial tolerances in the stack of fuel elements. When mounted at the inlet end, this annular spring has openings through which propellant passes axially into the annular flow distribution channel.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENT

Figure 1:
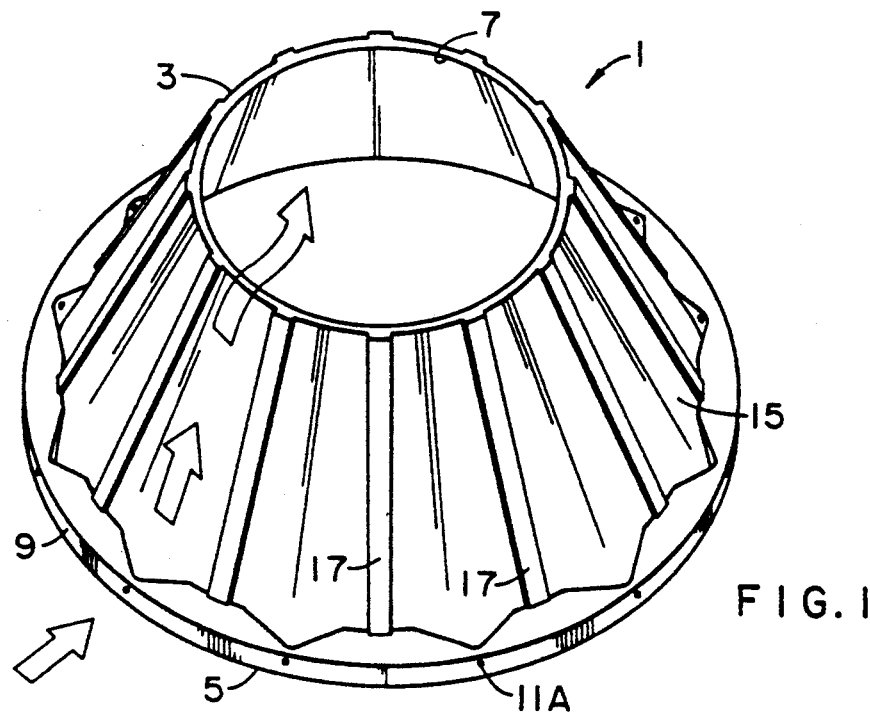
FIG. 1 is an isometric view of a fuel element in accordance with the invention.

Referring to FIG. 1, the fuel element 1 of the invention includes a truncated conical shell 3 having a base 5. The shell 3 has a very thin wall thickness, on the order of about 0.015 to about 0.030 inches (0.381 mm to 0.762 mm). Various known fueled materials can be used to form the shell 3. In particular, a carbide or cermet fuel material is suitable. For instance, uranium zirconium carbide, uranium nitride, or uranium oxide can be used for the fuel and various materials such as tungsten, molybdenum, or zirconium carbide can be used as a filler material. The formed shell can then be coated with tungsten, molybdenum, zirconium carbide, niobium carbide, tantalum carbide, or rhenium. A typical fuel element 1 has an outside diameter at the base of between about 2 and 4 inches (50 and 100 mm) and an inside diameter at the top opening 7, which is between about 0.4 and 0.6 times the base and typically between about 1 and 2 inches (25.4 and 50.8 mm).

Figure 2:
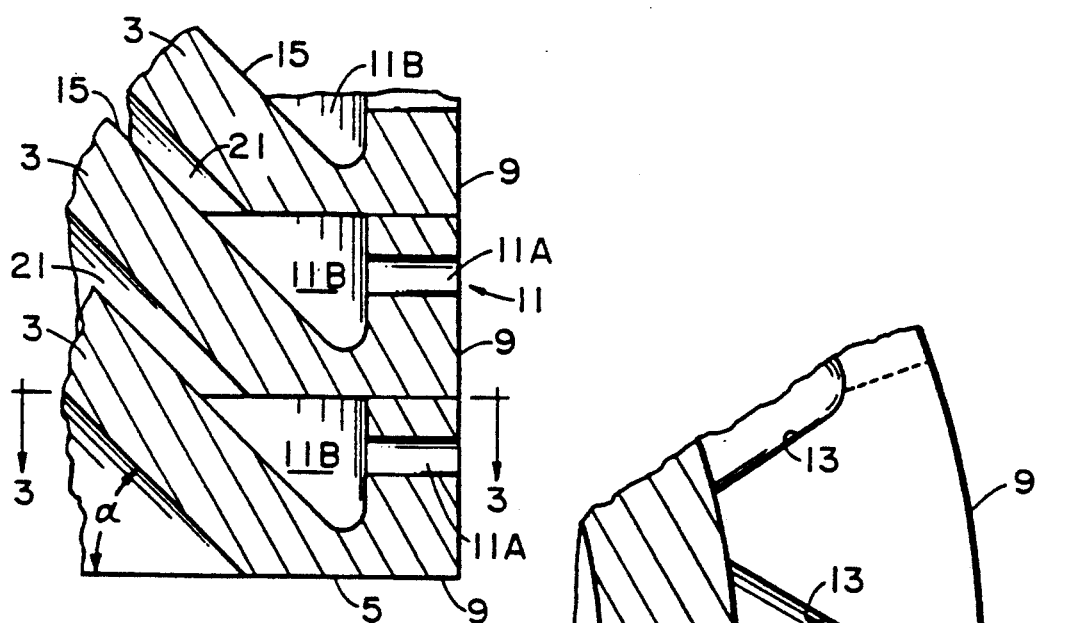
FIG. 2 is a fragmentary vertical section through a portion of the fuel element of FIG. 1.
Figure 3:
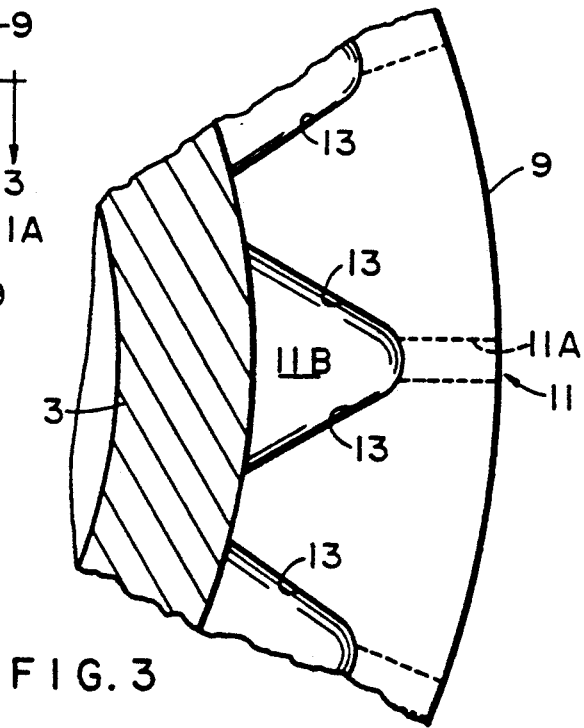
FIG. 3 is a fragmentary horizontal section through the portion of the fuel element shown in FIG. 2 taken along the line 3—3.

As shown more clearly in FIG. 2, an unfueled annular lip 9 extends around the base 5 of the shell. In the embodiment shown in FIGS. 1 and 2, the lip 9 is integral with the truncated conical shell 3 but is unfueled. Radial passages are provided through the lip 9 as can be seen in FIG. 3. These radial passages 11 have outer sections 11A of constant cross section, and inner sections 11B defined by walls 13 of the lip 9 which diverge radially inward. Thus, propellant introduced through the passages 11 is distributed peripherally around the outer surface 15 of the truncated conical shell 3.

Returning to FIG. 1, a number of angularly spaced ribs 17 project upward from and extend radially along the upper (or lower) surface 15 of the truncated conical shell 3. These ribs perform two functions. First, they form channels for guiding the flow of propellant over the upper surface 15 of the fuel element. The ribs also serve to maintain spacing between elements when they are stacked as will be discussed below. The ribs 17 may be formed integrally with the truncated conical shells 3 or made separately and affixed to the shell 3. These ribs are generally about 0.02 inches (0.5 mm) or less in height and have a width less than or equal to about twice the height. The height of the ribs 17 is determined by the spacing between fuel elements when stacked, which is typically about 0.01 inches (0.25 mm).

In the exemplary element shown there are twelve ribs 17. The number of ribs is based upon materials used, the stability of the fuel and the spacing between elements in the stack. The ribs are unfueled. While FIG. 1 shows one passage 11 between adjacent ribs 17, there can be several such passages for each channel.

The propellant for the nuclear thermal engine in which the fuel elements 1 are to be used enters through the passages 11 in the lip 9 at a relatively low temperature and is heated as it flows upward over the truncated conical shell and exits at the top at a high temperature. Under worst case conditions, the temperature gradient could approach 3000° K. This very high temperature gradient causes severe stress cracking in the flat annular fuel elements discussed previously. However, the conical shape of the fuel element 1 allows the upper end of the truncated conical shell to expand to a greater extent than the lower end without generating significant stress in the truncated conical shell. The shell 3 is a truncated right circular cone which has a base angle a. This base angle a is sufficient to allow the top of the shell to expand at a greater rate than the base due to the temperature gradient without generating undue stress in the shell. Typically, the base angle alpha is at least about 30° and preferably about 45° to about 60°. As the base angle alpha increases above 60°, the configuration of the shell 3 approaches a cylinder. While the cylinder allows differential expansion axially, it does not accommodate stacking of fuel elements except by grading the diameters of the successive cylinders. The truncated conical shells of the invention combine the advantages of generating low stresses in response to high temperature gradients, and permit stacking of the identically sized fuel elements. This eliminates the necessity of having to make graded sizes of fuel elements in order to stack them.

Figure 4:
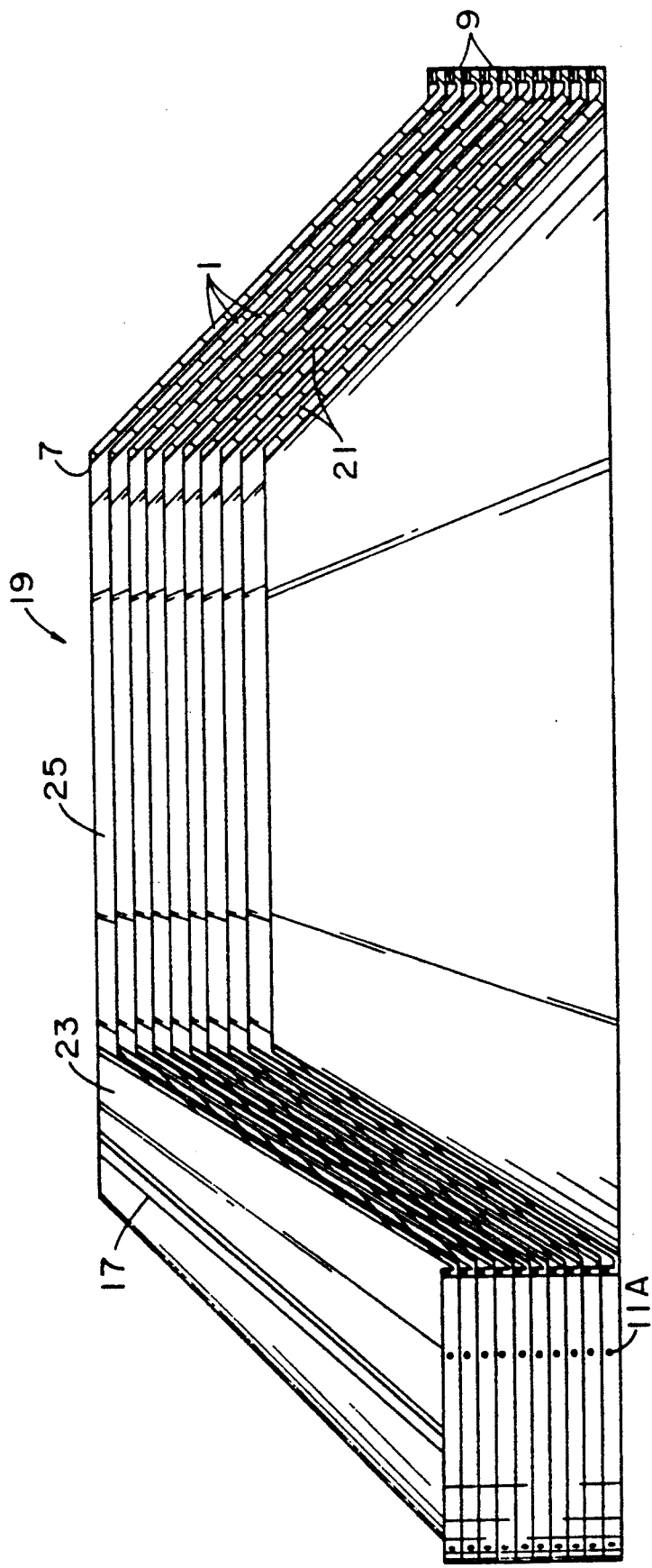
FIG. 4 is a front elevation view with part cut away of a stack of the fuel assemblies of FIG. 1.

FIG. 4 illustrates a stack 19 of the fuel elements 1 shown in FIGS. 1 through 3. As can be seen, the lips 9 of the successive fuel elements stack one on top of another with the truncated conical shells nesting to form frusto-conical flow passages 21 between. These frusto-conical flow passages 21 are divided into flow channels 23 by the ribs 17. Preferably, the ribs 17 do not touch the fuel element above; however, if the shell 3 of the fuel element 1 becomes distorted, the ribs will maintain a minimum spacing between shells 3. The top openings 7 in the shells 3 form a central cylindrical exhaust passage 25

Figure 5:
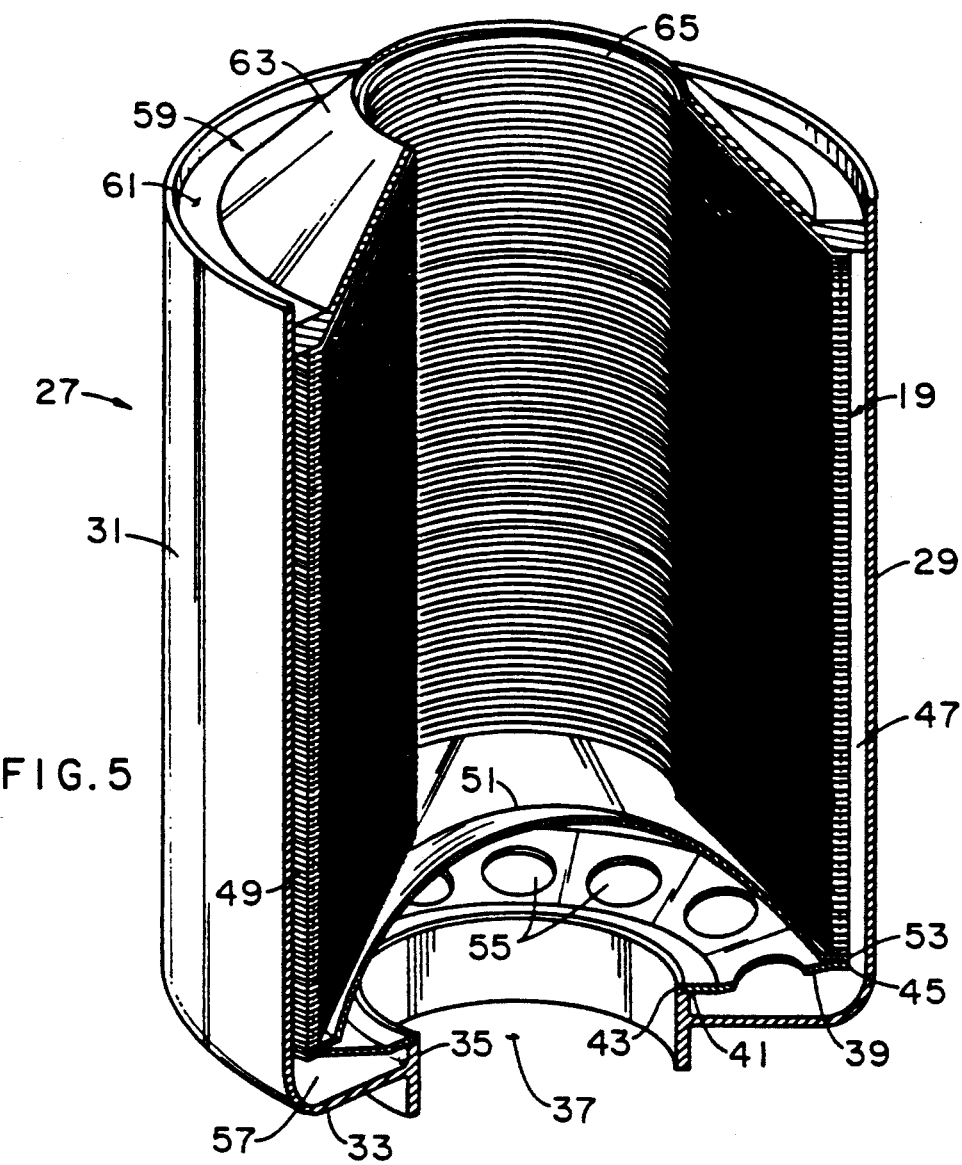
FIG. 5 is an isometric view with parts cut away of a fuel assembly in accordance with the invention.

FIG. 5 illustrates a fuel assembly 27 incorporating the stack 19 of fuel elements 1. The fuel assembly 27 has a housing 29 with a cylindrical side wall 31 with an annular end wall 33 at a first end having an integral rim 35 which defines a central inlet opening 37. An annular spring 39, such as a Belleville spring, has an inner edge 41 which seats in a groove 43 rabbeted in the rim 35. The stack 19 of fuel elements 1 is supported by the outer edge 45 of the spring 39. The housing 29 is sized so that an annular flow distribution channel 47 is provided between the cylindrical side wall 31 and the periphery 49 of the stack of fuel elements. A dome-shaped deflector 51 has an outer edge 53 which seats between the outer edge 45 of the spring 29 and the stack 19 of fuel elements to hold the deflector axially against he bottom of the fuel stack 19 and spaced from the inlet opening 37. A number of apertures 55 are provided in the annular spring 39. With the rim 35 spacing the spring 39 from the end wall 33 an annular chamber 57 is provided which communicates with the annular flow distribution channel 47.

The second, or exhaust end, of the housing 29 has an end wall 59 with a flat annular outer section 61 and a frusto-conical inner section 63 which covers the top fuel element of the stack 19.

In operation, propellant, such as hydrogen, is introduced through the inlet opening 37, is deflected radially outward by the deflector 51 through the apertures 55 in the spring 39 into the annular chamber 57 and then into the annular distribution flow channel 47. The propellant flows axially through the annular flow distribution channel 47 and into the radial passages 11 in the lips 9 of the individual fuel elements. The propellant then flows radially and axially through the flow channels 23 in the frusto-conical passages 21 between the shells 3 of the fuel elements and into the exhaust passage from which it passes out through the outlet 65. The sizing of the passages 11 in the individual fuel elements can be selected to locally adjust the flow in the various parts of the stack 19 of fuel elements.

The annular spring 39 takes up all tolerances in the stack 19 of fuel elements while allowing the lips 9 to thermally expand axially.

Figure 6:
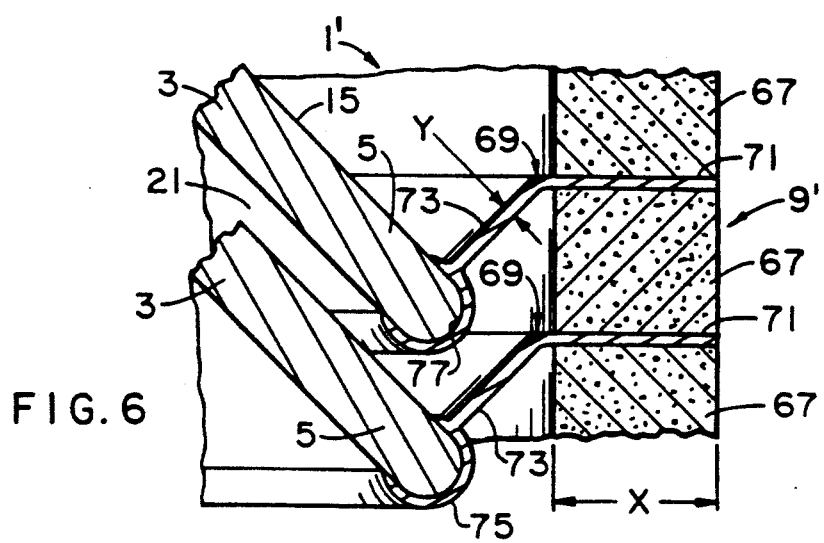
FIG. 6 is a fragmentary vertical section through a portion similar to that of FIG. 2 showing a modified form of the lip of the fuel element of FIG. 1.

An alternate embodiment of the fuel element 1' is shown in FIG. 6. The lip 9' includes a rigid annular ring 67 which is porous. Such a ring can be made, for example, from molybdenum, tungsten or rhenium. The ring 67 has a radial thickness X which is typically about 0.04 to 0.08 inches (1 to 2 mm).

The lip 9' also includes a compliant annular support member 69. This compliant annular support member has an outer annular section 71, which is clamped between adjacent rings 67 and an inner annular section 73 which is bent downward at an angle to the outer section 71. The inner section 73 has a terminal portion 75 which defines an annular groove 77 in which the base 5 of the truncated conical shell 3 seats. The outer annular section 73 extends generally perpendicular to the upper surface 15 of the truncated conical shell 3. This compliant support 69, therefore, forms a hinge which bends to accommodate for differential thermal expansion between the fuel element 1' and the porous ring 67. The flexible support 69 can be made of rhenium of a thickness Y typically about 0.003 inches (0.076 mm). A suitable method of making the flexible support would be through chemical vapor deposition (CVD) of the terminal portion 75 onto the base 5 of the truncated conical shell 3, and then to deposit by CVD the sections 73 and 71 on a suitably shaped substrate which is then removed.

In use of the fuel element 1', the gaseous propellant flows through the porous lip ring 67 and then into the frusto-conical flow passages 21 as shown by the arrows in FIG. 6. The porosity of the ring 67 may be adjusted to provide the appropriate flow distribution. This porosity could be adjusted depending upon the location of the particular fuel assembly 1' in the stack 19 of fuel elements in the fuel assembly 27 of FIG. 5.

Figure 7:
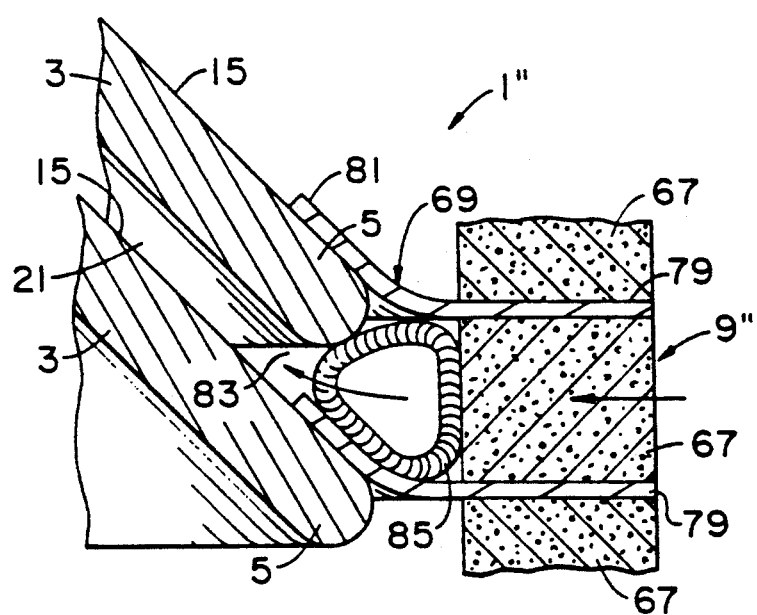
FIG. 7 is a fragmentary vertical section similar to FIG. 6 through another modified form of the lip of the element of FIG. 1.

FIG. 7 illustrates yet another embodiment of the fuel element 1". In this fuel element, the lip 9" includes the porous rigid annular ring 67 and compliant annular support 69'. The support 69' includes an outer annular section 79 clamped between adjacent rigid porous rings 67, cantilevered inner annular sections 81 extending upward at an angle to the outer section 79 forming an annular groove 83, and a compound helical spring 85 in the groove 83. In the exemplary fuel element 1", the compound helical spring 85 is made of 0.001 wire (0.025 mm) in a 0.004 helix (0.1 mm), wound into a 0.025 inch helix (0.6 mm). The base 5 of the truncated conical shell 3 is resiliently supported in the groove 83 by the compound helical spring 85.

The annular inner and outer sections of the compliant support 69', as well as the compound helical spring 85, may be made of tungsten, molybdenum or rhenium. Again, the inner and outer sections 79 and 81 may be grown by CVD processes to a thickness of typically of about 0.003 inches (0.076 mm), or may be stamped from sheet stock.

In use of the fuel element 1", the gaseous propellant flows radially inward through the porous rigid ring 67, through the spring 85 and groove 83 into the frusto-conical flow passage 21 as shown by the arrows in FIG. 7.

Figure 8:
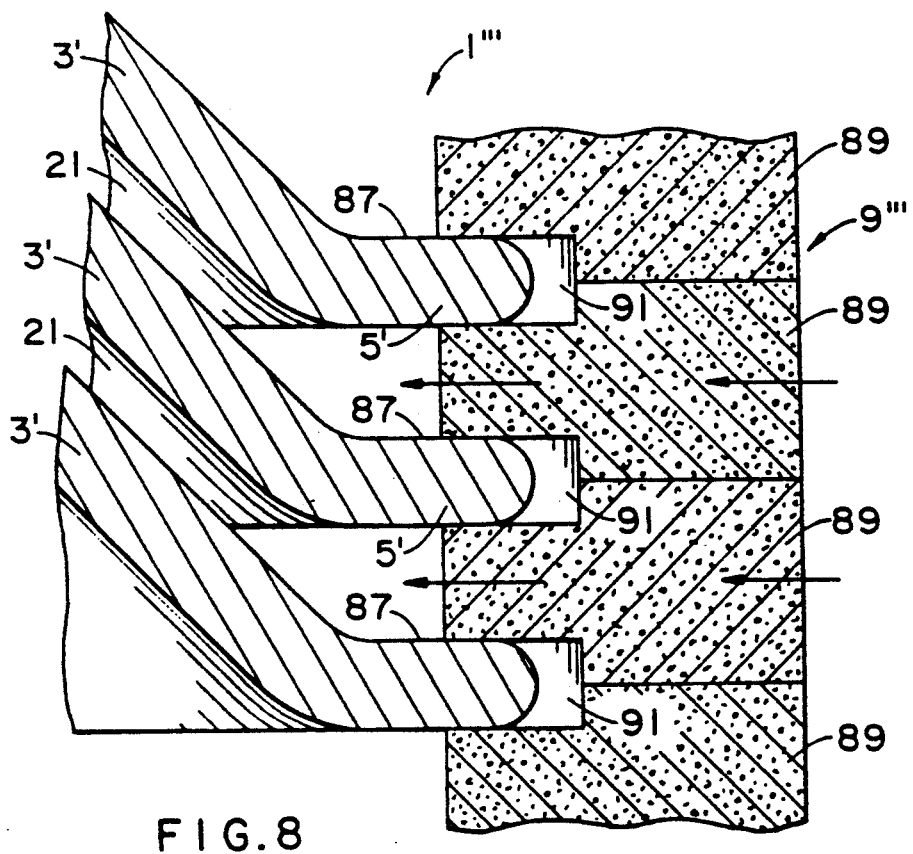
FIG. 8 is a fragmentary vertical section similar to FIG. 6 through another embodiment of the fuel element in accordance with the invention.

FIG. 8 illustrates still another, and perhaps preferred embodiment of the fuel element 1'''. In this fuel element, the shell 3' has a radially outwardly extending peripheral flange 87 at the base 5'. The lips 9''' are porous unfueled rings 89 rabbeted at the internal edges to form when stacked, internal annular grooves 91 in which the flanges 87 seat. Again, the gaseous propellant flows through the porous ring 89 into the frusto-conical fuel passages as shown by the arrows in FIG. 8.

The fuel elements and assemblies of the invention provide high heat transfer area, high-power density, eliminate hot spots due to fuel-to-fuel contacts and controllable flow. In addition, all thermal expansions are taken up without large stresses. Furthermore, the system is modular and can be fabricated with existing technology.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A fuel element for a nuclear thermal engine having a fueled truncated conical shell with a base characterized by an annular unfueled lip at said base having radial passages therethrough, wherein said annular lip is integral with said truncated conical shell, and said annular lip extends axially above said base.

2. The fuel element of claim 1 wherein said radial passages are defined by walls in said annular lip which diverge radially inwardly.

3. The fuel element of claim 1 wherein said annual lip is porous with pores forming said radial passages.

4. A fuel element for a nuclear thermal engine having a fueled truncated conical shell with a base characterized by an annular unfueled lip at said base having radial passages therethrough and a plurality of angularly spaced ribs extending radially along a truncated conical surface of said shell forming channels therebetween.

5. The fuel element of claim 4 wherein said truncated conical surface is an outer surface of said truncated conical shell.

6. The fuel element of claim 5 wherein said truncated conical shell has a base and said fuel element includes an annular lip extending radially outward from said base and with radial passages therethrough.

7. A fuel element for a nuclear thermal engine having a fueled truncated conical shell characterized by a plurality of angularly spaced unfueled ribs extending radially along at least one truncated conical surface of said shell forming channels therebetween.

8. A stack of fuel elements for a nuclear thermal engine having a plurality of fuel elements, each fuel element having a truncated conical shell with a base, characterized in that an annular lip with radial passages therethrough extends radially outward from said base, said fuel elements being stacked with said lips positioned on top of one another to form said stack with frusto-conical flow passages between adjacent elements and with said radial passages communicating with said frusto-conical flow passages.

9. The stack of fuel elements of claim 8 wherein each of said fuel elements has a plurality of angularly spaced ribs extending radially along a truncated conical surface of said frusto-conical shell dividing said truncated conical flow passages into flow channels.

10. The stack of fuel elements of claim 9 wherein said truncated conical surface is an outer surface of each of said truncated conical shells.

11. The stack of fuel elements of claim 8 wherein said annular lips of said fuel elements comprise rigid rings having radial passages therethrough and compliant annular supports extending radially inward from said rigid rings and supporting said truncated conical shells at said bases thereof.

12. The stack of fuel elements of claim 11 wherein said compliant annular support defines an annular groove in which said base of the truncated conical shell seats.

13. The stack of fuel elements of claim 13 wherein said compliant annular supports have annular outer sections which are clamped between adjacent rigid rings and annular cantilevered inner sections supporting said truncated conical shells at said bases.

14. The stack of fuel elements of claim 13 wherein said cantilevered inner sections of said compliant supports extend toward said truncated conical shells generally transverse to outer surfaces of said shells and terminate in annular grooves in which said bases of said truncated conical shells are supported.

15. The stack of fuel elements of claim 13 wherein said annular cantilevered inner sections of said compliant supports extend parallel t truncated conical surfaces of said truncated conical shells with adjacent inner sections forming annular slots into which the bases of the truncated conical shells extend, and including spring means in said annular slots resiliently supporting and centering said truncated conical shells.

16. The stack of fuel elements of claim 8 wherein said annular lips comprise rings with radial passages therethrough and having internal annular grooves in which the truncated conical shells seat.

17. The stack of fuel elements of claim 16 wherein the bases of said truncated conical shells have generally radially outwardly extending flanges which seat in said grooves in said rings.

18. The stack of fuel elements of claim 8 wherein said lips are unfueled and integral with the bases of said truncated conical shells.

* * * * *